United States Patent [19]

McConnell

[11] Patent Number: 4,593,753
[45] Date of Patent: Jun. 10, 1986

[54] EXHAUST GAS LIQUID HEATING SYSTEM FOR INTERNAL COMBUSTION ENGINES

[75] Inventor: Peter J. McConnell, Mount Waverley, Australia

[73] Assignee: McConnell Research Enterprises Pty. Ltd., Victoria, Australia

[21] Appl. No.: 669,894

[22] Filed: Nov. 9, 1984

[51] Int. Cl.[4] .......................... F01N 5/02; F02G 5/00; B05B 1/24; F28D 7/10
[52] U.S. Cl. ...................................... 165/51; 165/139; 165/144; 165/154; 239/129
[58] Field of Search .................... 165/51, 52, 41, 144, 165/169, 154, 139; 123/557; 239/129, 130

[56] References Cited

U.S. PATENT DOCUMENTS

| | | | |
|---|---|---|---|
| 1,113,410 | 10/1914 | Coffill | 165/51 |
| 1,157,101 | 10/1915 | Halliday | 165/52 |
| 1,187,333 | 6/1916 | Kenney | 165/41 |
| 1,610,810 | 12/1926 | Noll | 165/139 |
| 2,661,934 | 12/1953 | Stutz | 165/154 |
| 2,698,162 | 12/1954 | Riesgo | 165/154 |
| 3,186,394 | 6/1965 | Ramun | 165/144 |
| 4,015,567 | 4/1977 | Zabenskie | 123/557 |
| 4,284,127 | 8/1981 | Collier et al. | 165/51 |

FOREIGN PATENT DOCUMENTS

| | | | |
|---|---|---|---|
| 98212 | 5/1924 | Australia | 165/154 |
| 1828 | of 1926 | Australia | 165/152 |
| 177609 | 7/1953 | Australia | 165/154 |
| 101111 | 8/1916 | United Kingdom | 165/154 |

Primary Examiner—William R. Cline
Assistant Examiner—John K. Ford
Attorney, Agent, or Firm—Watson, Cole, Grindle & Watson

[57] ABSTRACT

A heat exchanger system for utilizing the exhaust gases of an internal combustion engine to heat liquid. A system for heating water to be used in a carpet and furniture cleaning system is disclosed. A pump circulates water from a holding tank through a serial circuit including copper coils wound around primary exhaust pipes from an engine to a primary heat exchanger and a secondary exhaust pipe from the heat exchanger to the remainder of the exhaust system. The circuit includes the primary heat exchanger which comprises concentric copper tubes forming a water jacket therebetween. The exhaust gases enter the inner tube adjacent opposite ends and a deflector plate adjacent each entry causes a helical passage of the exhaust gases from either end along the inner tube in a manner causing maximum turbulence so as to maximize heat transference to the wall of the inner tube and thus the water jacket. The secondary exhaust pipe exits the exhaust gases mid-way between the ends of the heat exchanger. The water passes along the water jacket from one end of the heat exchanger to the other and then back to the holding tank for use or possible re-circulation. A solenoid valve directs the returning water to waste if the temperature in the holding tank reaches a predetermined high when usage of water is low.

7 Claims, 3 Drawing Figures

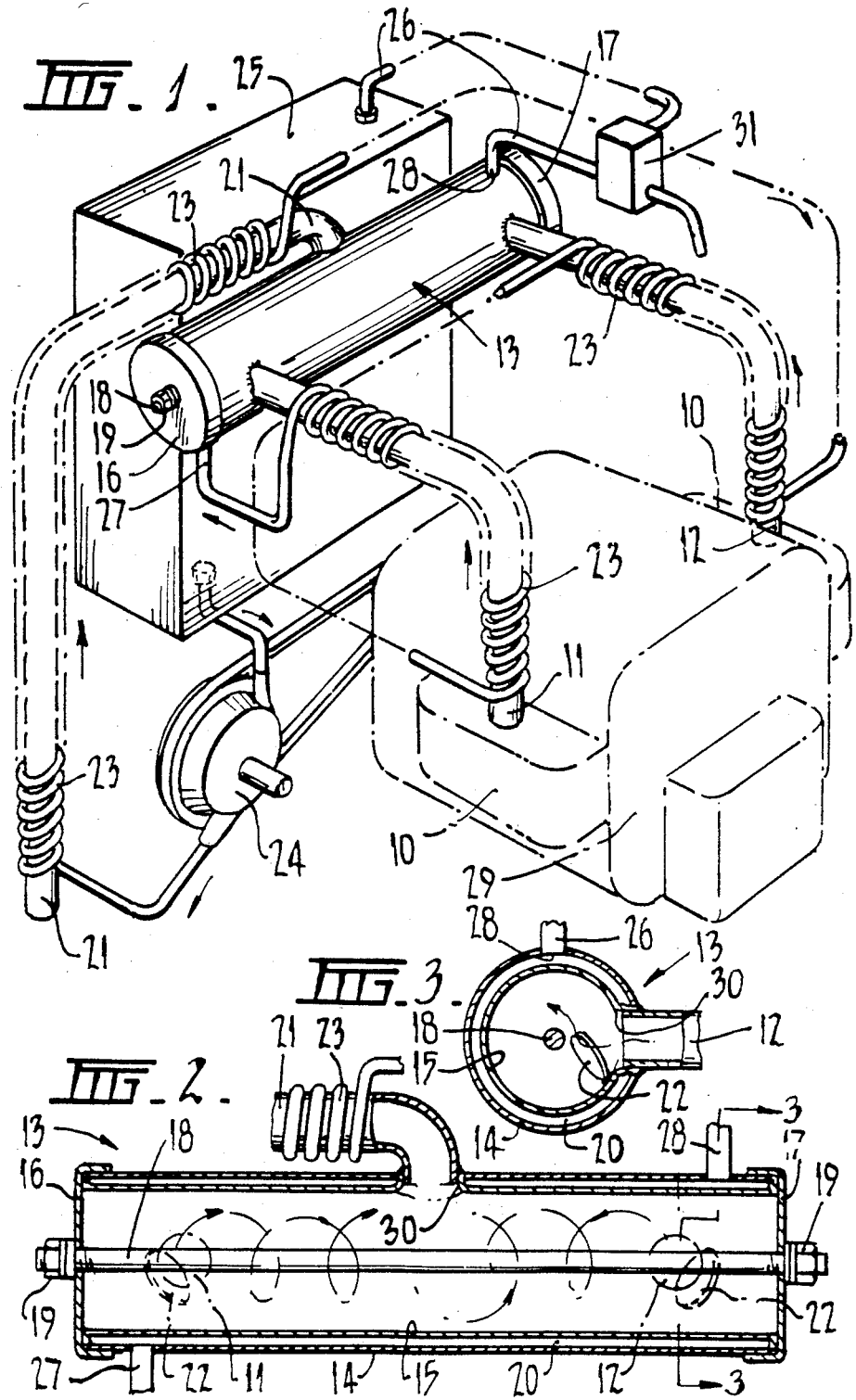

EXHAUST GAS LIQUID HEATING SYSTEM FOR INTERNAL COMBUSTION ENGINES

This invention relates to internal combustion engines and in particular to a liquid heating system utilizing the exhaust gases of an internal combustion engine. The system according to the invention has particular utility in carpet and/or furniture cleaning systems which use hot water under pressure for cleaning purposes and a vacuum suction to withdraw the resultant fluid as well as lint and dirt. Of course the invention is not limited in its application to hot water type cleaning systems since the energy obtained by way of heated liquid may be utilized in many other applications.

It is well known that the overall efficiency of an internal combustion engine is about 15%–20% and about 30%–40% of the loss is by way of the engine exhaust system. Thus there have been numerous attempts to utilize this wasted energy with varying degrees of success but generally speaking, the prior art attempts have caused excessive back pressure on the engine thereby restricting gas flow with the resultant premature engine valve failure.

Accordingly, it is an object of this invention to provide an improved exhaust gas water heating system for an internal combustion engines which is more efficient than known systems and which avoids or at least reduces the possibility of premature engine valve failure.

Thus the invention provides an exhaust gas liquid heating system for internal combustion engines, said system comprising a main heat exchanger spaced from an engine exhaust manifold and connected thereto by a primary exhaust pipe which extends, in use, between an exhaust port of the engine and said main heat exchanger, said main heat exchanger comprising; inner and outer tubes forming a liquid jacket therebetween, inlet means whereby said primary exhaust pipe is connected to communicate with the bore of said inner tube between the ends thereof, outlet means whereby a secondary exhaust pipe is connected to communicate with the bore of said inner tube between the ends thereof and at a point spaced from said inlet means and end caps forming a fluid seal over the ends of said tubes; and a serial liquid circuit including a holding tank, a pump for pumping liquid from said tank through a series of heat conducting coils wound around said primary and secondary exhaust pipes and in contact therewith, a liquid inlet on said main heat exchanger for providing communication between an end of said coils and said liquid jacket, and a liquid outlet on said main heat exchanger for providing communication between said liquid jacket and a tube extending to said holding tank, said liquid inlet and outlet being spaced apart along a portion of the length of said main heat exchanger being a similar portion over which said inlet and outlet means are spaced whereby exhaust gases passing along said inner tube between said inlet means and outlet means cause heat to be supplied to liquid passing along said liquid jacket between said liquid inlet and liquid outlet.

In order that the invention may be more readily understood, one particular embodiment will now be described with reference to the accompanying drawings wherein:

FIG. 1 is a schematic diagram of an exhaust gas water heating system according to the invention;

FIG. 2 is a sectional side elevation of the main heat exchanger of FIG. 1, and

FIG. 3 is a section on the lines 3—3 of FIG. 2.

In the drawings an internal combustion engine exhaust manifold 10 has exhaust pipes 11 and 12 extending therefrom and connecting to a main heat exchanger 13. The engine 29 in this particular case is a two cylinder 20 hp petrol engine and consequently it has two exhaust ports which correspond with the respective exhaust pipes 11 and 12 such that exhaust gases discharged from the engine pass immediately into the pipes 11 and 12 and thereafter to the main heat exchanger 13.

The heat exchanger 13 consists essentially of a pair of concentric copper tubes 14 and 15, respectively, which extend between opposed end plates 16 and 17. The end plates 16 and 17 are held in position by a longitudinal bolt 18 which extends internally through the tubes 14 and 15 and includes retaining nuts 19 for tightening the end plates into fluid sealing engagement with the ends of the tubes 14 and 15. In this particular embodiment the main heat exchanger 13 is approximately eighteen inches long and the outer copper tube 14 is formed of eighteen gauge copper and is four inches in outside diameter. The inner copper tube 15 is of twelve gauge copper tube and is three and one half inches in outside diameter. Thus an annular water jacket is provided in the three sixteenth inch gap between the inner tube 15 and the outer tube 14.

The exhaust pipes 11 and 12 are connected to the heat exchanger 13 in a manner whereby exhaust gases from the engine pass into the bore of the inner tube 15. For this purpose the inner tube 15 is formed with connecting means in the form of a spigot 30 which passes through the water jacket 20 formed between the inner tube 15 and outer tube 14. The spigot is formed integral with the inner tube 15 using a special tool for the purposes of forming the material of the inner tube 15 into a shallow spigot which is able to pass through a hole provided in the outer tube 14 at each location of the connecting means. The exhaust pipes 11 and 12 are sliding fit to the spigots or connecting means and thus the manifold 10, exhaust pipes 11 and 12, and main heat exchanger 13 form an integral unit once assembly has been completed. Of course the spigots are sealed by silver soldering at the point where they pass through the outer tube 14 so that the water jacket 20 is properly sealed for reasons which will be apparent herein. It should be noted that the respective exhaust pipes 11 and 12 enter the heat exchanger 13 towards opposite ends thereof. A secondary exhaust pipe 21 is connected to the heat exchanger 13 in a samilar manner to the exhaust pipes 11 and 12 but is arranged mid-way therebetween. The secondary exhaust pipe 21 provides an outlet for exhaust gases entering the bore of inner tube 15 via the exhaust pipes 11 and 12. The secondary exhaust pipe 21 carries the exhaust gases to an exhaust system appropriate to the particular engine where such exhaust gases are dissipated.

A separate baffle or deflector plate 22 is arranged in the inner tube 15 adjacent each of the exhaust pipes 11 and 12. The purpose of the deflector plates 22 is to cause the exhaust gases entering the tube 15 to move in a generally helical path along the tube towards connecting means for the secondary exhaust pipe 21. It should be noted that the deflectors are arranged to cause the helical path of the exhaust gases along the heat exchanger 13 to be in opposed directions from opposite ends. In other words, looking along the direction of flow from the exhaust pipe 11 where it enters the exchanger 13, towards the connecting means of secondary exhaust pipe 21, lets say the helical path is in an anticlockwise direction, then likewise looking along the heat exchanger 13 from the exhaust pipe 12 towards the connecting means of secondary exhaust pipe 21 the helical path will again be in an anti-clockwise direction. This opposition in the helical directions of flow causes an additional turbulance within the main heat exchanger 13 which causes a better transference of heat from the exhaust gases to the walls of the inner tube 15 and thence to the water jacket 20.

In order to provide hot water according to the system, a hot water circuit consisting essentially of a copper tube 23 provides a serial circuit via auxiliary heat exchangers in the form of coils formed in the copper tube 23 around the exhaust pipes 11 and 12 and the secondary exhaust pipe 21. The serial circuit includes a pump 24 and a holding tank 25. The holding tank 25 stores hot water produced by the system which is returned to the tank 25 from the heat exchanger 13 via a hose connected to a copper tube 26 which is an extension of the copper tube 23 on the primary or input side of the heat exchanger 13. The pump 24 draws water from the bottom of the holding tank 25 and pumps the water through the copper tube 23 in its path around the various exhaust pipes. After passing around the exhaust pipes in contact therewith the copper tube 23 is connected via a hose to an inlet 27 in the outer tube 14 of the heat exchanger 13, adjacent one end thereof. Water in the copper tube 23 therefore enters the water jacket 20 and is able to pass along the length of the heat exchanger 13 to an outlet 28 at the opposite end of the heat exchanger. It should be noted that the inlet 27 and the outlet 28 as well as being at opposite ends of the heat exchanger 13 are diametrically opposite so that water in the water jacket 20 must pass to the opposite side of the tube in order to flow out the outlet 28 and into the tube 26. The location of the inlet 27 and outlet 28 on opposite sides of the tube ensures that a good flow of water occurs around the water jacket 20 so that maximum heat transference occurs between the exhaust gases within the inner tube 15 and the water. The copper tubes 23 and 26 constituting the serial circuit for water flow comprises three eighths of an inch outside diameter copper tube of eighteen gauge thickness. There are about twenty turns of the copper tube 23 around each of the exhaust pipes 11 and 12 and about fifty turns around the secondary exhaust pipe 21. The exhaust pipes 11 and 12 have a one and a quarter inch diameter and are formed of ten gauge copper whereas the secondary exhaust pipe 21 has a one and one half inch outer diameter and is formed from eighteen gauge copper. The turns of the copper tube 23 are tightly wound against the outer surface of the respective exhaust pipes and are soldered thereto using silver solder. This ensures a good heat transference between the hot surface of the exhaust pipes and the copper tube carrying the water. Various elbows (not shown) provided in the secondary exhaust pipe 21 to change the direction thereof enhance the transfer of heat from the exhaust gases to the water within the tube 23. Once passing out of the heat exchanger 13 the water returns to the holding tank 25 from which it may be drawn on to the remainder of the system (not shown) or recirculated by the pump 24 to be further heated. The water in the holding tank 25 provides a supply which in the present embodiment is used in carpet cleaning equipment (not shown) for the purpose of high pressure water cleaning of carpet and furniture. It will be appreciated that water circulated around the system is continually being drawn off by the external equipment and thus it is necessary to replenish the water in the holding tank 25. For this purpose a float valve (not shown) in the holding tank is used to introduce fresh water into the holding tank. Furthermore, a solenoid valve 31 controlled by a thermostat (not shown) is arranged in the copper tube 26 between the heat exchanger 13 and the holding tank 25 to divert circulated water to waste when the temperature in tne holding tank 25 exceeds a predetermined limit. In other words, if the rate of usage of water in the holding tank 25 drops to the extent that recirculation of the water causes an excess temperature rise, the thermostat actuates the solenoid valve to divert the water from the heat exchanger 13 to waste rather than allowing it to flow back into the holding tank 25 where it would then be recirculated and heated further. Diversion of water to waste causes the float valve to operate and introduce additional cold water into the holding tank in the same manner as occurs due to usage of the water in the holding tank for cleaning purposes.

Whilst the embodiment described relates to a two cylinder petrol engine, it is conceivable that the system according to the invention could be applied to many other forms of internal combustion engines. It is important that the exhaust pipes into the heat exchanger 13 are arranged such that maximum flow of exhaust gas and turbulance occurs in the heat exchanger 13 and thus for engines of more cylinders it will be necessary to space the exhaust pipes along the length of the heat exchanger 13 to obtain maximum benefit. In a single cylinder engine the sole exhaust pipe would connect to one end of the heat exchanger tube and the secondary exhaust pipe or outlet pipe would be arranged at the opposite end. Whilst the invention is described in relation to a system for producing hot water for use in cleaning equipment, it is conceivable that it could be adapted to heat liquids other than water for use in systems which may be other than cleaning systems.

I claim:

1. An exhaust gas liquid heating system for a two cylinder internal combustion engine, said system comprising a main heat exchanger spaced from an engine exhaust manifold and connected thereto by a pair of primary exhaust pipes which extend, in use, between exhaust ports of the engine and said main heat exchanger, said main heat exchanger comprising; inner and outer tubes forming a liquid jacket therebetween, inlet means whereby said primary exhaust pipes are respectively connected to communicate with the bore of said inner tube adjacent opposite ends thereof, outlet means whereby a secondary exhaust pipe is connected to communicate with the bore of said inner tube between the ends thereof and at a point substantially midway between said inlet means, and end caps forming a fluid seal over the ends of said tubes; and a serial liquid circuit including a holding tank, a pump for pumping liquid from said tank through a series of heat conducting coils wound around said primary and secondary exhaust pipes and in contact therewith, a liquid inlet on said main heat exchanger for providing communication between an end of said coils and said liquid jacket, and a liquid outlet on said main heat exchanger for providing communication between said liquid jacket and a tube extending to said holding tank, said liquid inlet and outlet being spaced apart along a portion of the length of said main heat exchanger being a similar portion over which said inlet and outlet means are spaced whereby exhaust gases passing along said inner tube between said inlet means and outlet means causes heat to be supplied to liquid passing along said liquid jacket between said liquid inlet and liquid outlet.

2. A system according to claim 1 wherein said inner and outer tubes are cylindrical and a deflector plate is arranged within said inner tube adjacent each said inlet means to deflect said exhaust gases in a generally helical path along said inner tube towards said outlet means.

3. A system according to claim 2 wherein the helical path of said exhaust gases between the respective inlet means and said outlet means is in opposed circular directions around said inner tube as well as being in opposed longitudinal directions to thereby produce maximum turbulence within said inner tube and thence maximum heat transference between said exhaust gases and the wall of said inner tube.

4. A system according to claim 3 wherein said tubes are co-terminus in length and a single end cap is provided at each end of said main heat exchanger to form a fluid seal over the end of said inner tube and a liquid seal over the ends of said liquid jacket, a longitudinal bolt extending through the centre of said end caps and along the centre line of said inner tube for the purpose of retaining said end caps in place.

5. A system according to claim 4 wherein said liquid is water and wherein said liquid inlet and liquid outlet are arranged on said outer tube adjacent respective ends thereof and in diametrically opposed circumferential locations whereby maximum circulation of water in said liquid jacket is achieved during passage of water from said liquid inlet to said liquid outlet.

6. A system according to claim 5 wherein said serial liquid circuit comprises a first coil in said series being immediately downstream from said pump and wound on said secondary exhaust pipe, a second coil in said series being immediately downstream of said first coil and wound on one of said primary exhaust pipes, and a third coil in said series being immediately downstream of said second coil and being wound on the other of said primary exhaust pipes.

7. A system according to claim 6 wherein said coils are formed of copper tube wound tightly over said exhaust pipes and soidered thereto to provide a contact which is a good heat conducting contact.

* * * * *